US012566849B2

(12) United States Patent (10) Patent No.: US 12,566,849 B2
Soffer et al. (45) Date of Patent: Mar. 3, 2026

(54) METHOD AND APPARATUS FOR SECURING POWER DELIVERY SIDE CHANNEL

(71) Applicant: HIGH SEC LABS LTD., Caesarea (IL)

(72) Inventors: Aviv Soffer, Caesarea (IL); David Hirshberg, Haifa (IL); Andrey Vorbyoff, Haifa (IL)

(73) Assignee: HIGH SEC LABS LTD., Caesarea (IL)

( * ) Notice: Subject to any disclaimer, the term of this patent is extended or adjusted under 35 U.S.C. 154(b) by 0 days.

(21) Appl. No.: 18/834,120

(22) PCT Filed: Jan. 3, 2023

(86) PCT No.: PCT/IB2023/050022
§ 371 (c)(1),
(2) Date: Jul. 29, 2024

(87) PCT Pub. No.: WO2023/148557
PCT Pub. Date: Aug. 10, 2023

(65) Prior Publication Data
US 2025/0103709 A1 Mar. 27, 2025

Related U.S. Application Data

(60) Provisional application No. 63/305,279, filed on Feb. 1, 2022.

(51) Int. Cl.
G06F 21/55 (2013.01)
(52) U.S. Cl.
CPC ...... G06F 21/554 (2013.01); G06F 2221/034 (2013.01)

(58) Field of Classification Search
USPC ............................................. 726/23
See application file for complete search history.

(56) References Cited

U.S. PATENT DOCUMENTS 8,646,082 B2 2/2014 Lomont et al.
8,862,803 B2 10/2014 Powers et al.
(Continued)

FOREIGN PATENT DOCUMENTS

WO WO-2021165952 A1 * 8/2021 .......... H02J 7/00712

*Primary Examiner* — Brandon Hoffman
(74) *Attorney, Agent, or Firm* — FisherBroyles, LLP; Roger L. Browdy; Ronni S. Jillions

(57) ABSTRACT

A method, security agents, devices and medium for securing devices using combined power data (CPD) protocols that support power delivery side channels. The method/devices/medium comprise one or more security agents that perform at least one of or any combination of: monitoring the signaling and power on the power delivery pins; analyzing the power delivery protocol traffic to detect cyber-security events; detecting malicious activity on the power delivery protocol; filtering or blocking specific type of packets or messages with specific data payload; enforcing unidirectional data flow on the power delivery protocol; logging, auditing and archiving events on the power delivery protocol; locking or disconnecting suspicious devices; preventing activation of some power delivery modes; disabling firmware updates through power delivery protocol; enabling firmware updates through power delivery protocol only in the presence or with a confirmation of a setup device; and allowing passage of only specific type of packets or messages with specific data payloads.

33 Claims, 2 Drawing Sheets

(56)     References Cited

U.S. PATENT DOCUMENTS

| | | | |
|---|---|---|---|
| 8,869,308 B2 | 10/2014 | Soffer | |
| 2011/0088093 A1 | 4/2011 | Kang et al. | |
| 2012/0079563 A1 | 3/2012 | Green et al. | |
| 2014/0337558 A1 | 11/2014 | Powers et al. | |
| 2018/0225230 A1* | 8/2018 | Litichever | G06F 21/56 |
| 2019/0253439 A1* | 8/2019 | Payton | H04L 12/40 |
| 2020/0226298 A1 | 7/2020 | Appleboum et al. | |
| 2021/0006407 A1 | 1/2021 | Soffer | |
| 2022/0284136 A1 | 9/2022 | Bilbao et al. | |
| 2023/0119025 A1 | 4/2023 | Zeller | |

* cited by examiner

METHOD AND APPARATUS FOR SECURING POWER DELIVERY SIDE CHANNEL

FIELD OF THE INVENTION

The present invention, in some embodiments thereof, relates to security device, apparatus or circuitry/circuitries of communication using side channels and more particularly, but not exclusively, to secure device, apparatus, or circuitry/circuitries and methods thereof of power delivery side channel.

BACKGROUND OF THE INVENTION

In recent years, communication protocols between adjacent devices using cables are progressing dramatically. First, there was a convergence between transfer of data and transfer of power on a single protocol, cable and connectors, then power delivery side channel was introduced to negotiate different power delivery modes between the devices. The power delivery modes may differ by the identity of the device that provide the power (the power source), the identity of the device that consume the power (the power sink), the supplied voltage, the maximum supplied current, and the like. The first and most common protocol that uses power delivery side channel is a USB protocol, and in specific, the power delivery side channel of USB 3.X protocol that is established by adding two extra lines: CC1 and CC2, to the USB type C connector. The power delivery protocol of USB 3.X provides the ability for USB devices to communicate, i.e., negotiate, between themselves in order to set the power delivery mode dynamically. While power delivery side channel has many usability advantages, it creates a new, inattentively, disadvantage of vulnerability to cyber-attacks from one device to the other using this side channel. An objective of this invention is to provide security measures to reduce cyber-attacks vulnerability to devices that are connected by combined power and data communication protocol (CPD protocol) comprising power delivery side channel.

SUMMARY OF THE INVENTION

According to aspects of some embodiments of the present invention, a securing methods and agents are provided to secure device, apparatus or circuitry/circuitries of communication, that are using power delivery side communication channel against cyber-security vulnerabilities.

According to an aspect of some embodiments of the present invention there is provided a security agent that is configured to be integrated within a device or a medium that support a CPD protocol, comprising a power delivery side channel, wherein the security agent performs at least one of or any combination of:

a. monitoring the signaling and power on the power delivery pins;

b. analyzing the power delivery protocol traffic to detect cyber-security events;

c. detecting malicious activity on the power delivery protocol;

d. filtering or blocking specific type of packets or messages or packets or messages with specific data payload;

e. enforcing unidirectional data flow on the power delivery protocol;

f. logging, auditing and archiving events on the power delivery protocol;

g. locking or disconnecting suspicious devices;

h. preventing activation of some power delivery modes;

i. disabling firmware updates through power delivery protocol;

j. enabling firmware updates through power delivery protocol only in the presence or with a confirmation of a setup device; and k. allowing passage of only specific type of packets or messages or packets or messages with specific data payloads.

According to some embodiments of the invention, the security agent is further performing at least one of or any combination of:

a. creating automatic messages, such as acknowledge messages to enable secure operation;

b. building a profile of typical PD protocol activity and alerting abnormal behavior;

c. enabling or disabling pairing of devices using a pre-configured white list/black list;

d. enabling initial pairing of devices only in the presence or with a confirmation of a setup device;

e. receiving configuration and setup data and commands from a setup device or from any communication channels of CPD interface connector;

f. receiving configuration and setup data and commands through short range wireless communication protocols, wherein the protocols is at least one of Bluetooth or NFC;

g. managing and handling encryption keys exchange;

h. enabling firmware updates of device through power delivery protocol from another device only in the presence or with a confirmation of a setup device;

i. providing encrypting and decrypting of sensitive data; and j. performing AI processing to detect suspicious patterns of abuse of the power delivery channel.

According to some embodiments of the invention, the security agent is integrated in is at least one of: (a) mobile device, (b) smartphones, (c) PDA, (d) laptop, (e) tabulate, (f) notebook computer, (g) external disk, (h) charger, (i) adapter, (j) display, (k) keyboard, (l) pointing device, (m) camera, (n) multimedia device, (o) medical device, (p) sensor, (q) security device, (r) dongle, (s) docking station, and (t) KVM switch.

According to some embodiments of the invention, the security agent that integrated in, is at least one of: (a) cable, (b) connector, (c) add-on connector, (d) mediator device, (e) hub, (f) bridge, (g) router, (h) switch, (i) adapter, (j) peripheral switch, (k) peripheral sharing device, (l) peripheral isolator device, and (m) KVM switch.

According to some embodiments of the invention, the security agent is implemented at least in one of the following locations or in any combination of the following locations: (a) in between the CPD connector and the CPD physical layer circuitries; (b) as part of the CPD physical layer circuitries; (c) in between the CPD physical layer circuitries; (d) the CPD data layer circuitries; and (e) as part of the CPD data layer circuitries.

According to some embodiments of the invention, the security agent is further comprises an element located in the data path of any one of the CPD data communication channels, wherein the element performs at least one of or any combination of the following operations: (a) enable or disable any one of CPD data communication channels; (b) enforce unidirectional communication in any direction of any one of CPD data communication channels; and (c) filters our packets or messages in any one of CPD data communication channels.

According to some embodiments of the invention, the security agent is at least partially implemented using a microcontroller.

According to some embodiments of the invention, the security agent is configured to communicate with a setup device.

According to some embodiments of the invention, the CPD protocol is USB and the power delivery side channel is USB Power Delivery side channel.

According to some embodiments of the invention, the CPD interface connector is USB type C connector.

According to some embodiments of the invention, the security agent is connected to CC1 and CC2 pins of the USB type C connector.

According to an aspect of some embodiments of the present invention there is provided a medium or a device supporting a CPD protocol comprising a power delivery side channel, the medium or device comprises one and more security agents wherein the one and more security agents perform at least one of or any combination of:

a. monitoring the signaling and power on the power delivery pins;
   b. analyzing the power delivery protocol traffic to detect cyber-security events;
   c. detecting malicious activity on the power delivery protocol;
   d. filtering or blocking specific type of packets or messages or packets or messages with specific data payload;
   e. enforcing unidirectional data flow on the power delivery protocol;
   f. logging, auditing and archiving events on the power delivery protocol;
   g. locking or disconnecting suspicious devices;
   h. preventing activation of some power delivery modes;
   i. disabling firmware updates through power delivery protocol;
   j. enabling firmware updates through power delivery protocol only in the presence or with a confirmation of a setup device; and
   k. allowing passage of only specific type of packets or messages or packets or messages with specific data payloads.

According to some embodiments of the invention the one and more security agents further perform at least one of or any combination of:

a. creating automatic messages, such as acknowledge messages to enable secure operation;
   b. building a profile of typical PD protocol activity and alerting abnormal behavior;
   c. enabling or disabling pairing of devices using a pre-configured white list/black list;
   d. enabling initial pairing of devices only in the presence or with a confirmation of a setup device;
   e. receiving configuration and setup data and commands from a setup device or from any communication channels of CPD interface connector;
   f. receiving configuration and setup data and commands through short range wireless communication protocols, wherein the protocols is at least one of Bluetooth or NFC;
   g. managing and handling encryption keys exchange;

h. enabling firmware updates of device through power delivery protocol from another device only in the presence or with a confirmation of a setup device;
   i. providing encrypting and decrypting of sensitive data; and
   j. performing AI processing to detect suspicious patterns of abuse of the power delivery channel.

According to an aspect of some embodiments of the present invention there is provided a method for securing devices using combined power data (CPD) protocols, the method comprises: providing one or more security agents in a CPD medium or between the device's CPD interface connector and the device functional circuitries, wherein the one and more security agents perform at least one of or any combination of:

a. monitoring the signaling and power on the power delivery pins;
   b. analyzing the power delivery protocol traffic to detect cyber-security events;
   c. detecting malicious activity on the power delivery protocol;
   d. filtering or blocking specific type of packets or messages or packets or messages with specific data payload;
   e. enforcing unidirectional data flow on the power delivery protocol;
   f. logging, auditing and archiving events on the power delivery protocol;
   g. locking or disconnecting suspicious devices;
   h. preventing activation of some power delivery modes;
   i. disabling firmware updates through power delivery protocol;
   j. enabling firmware updates through power delivery protocol only in the presence or with a confirmation of a setup device; and
   k. allowing passage of only specific type of packets or messages or packets or messages with specific data payloads.

According to some embodiments of the invention the one and more security agents further perform at least one of or any combination of:

a. creating automatic messages, such as acknowledge messages to enable secure operation;
   b. building a profile of typical PD protocol activity and alerting abnormal behavior;
   c. enabling or disabling pairing of devices using a pre-configured white list/black list;
   d. enabling initial pairing of devices only in the presence or with a confirmation of a setup device;
   e. receiving configuration and setup data and commands from a setup device or from any communication channels of CPD interface connector;
   f. receiving configuration and setup data and commands through short range wireless communication protocols, wherein the protocols is at least one of Bluetooth or NFC;
   g. managing and handling encryption keys exchange;
   h. enabling firmware updates of device through power delivery protocol from another device only in the presence or with a confirmation of a setup device;
   i. providing encrypting and decrypting of sensitive data; and
   j. performing AI processing to detect suspicious patterns of abuse of the power delivery channel.

Unless otherwise defined, all technical and/or scientific terms used herein have the same meaning as commonly understood by a person having ordinary skill in the art to which the invention pertains. Although methods and circuitries similar or equivalent to those described herein can be used in the practice or testing of embodiments of the invention, exemplary methods and/or circuitries are described below. In case of conflict, the patent specification, including definitions, will control. In addition, the circuitries, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a flash memory and/or removable media, for storing instructions and/or data.

BRIEF DESCRIPTION OF THE DRAWINGS

Some embodiments of the invention are herein described, by way of example only, with reference to the accompanying drawings. The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 is a schematic view of two devices communicating over combined power and data (CPD) protocol in accordance with the present invention;

FIG. 2 is a schematic view of FIG. 1 with the optional locations for deployment of Power Delivery Cyber-Security Agent (PDCSA) in accordance with the present invention; and FIG. 3 is a schematic view of a cyber-security cable in accordance with some embodiments of the present invention.

DETAILED DESCRIPTION OF THE INVENTION

Figure 3:
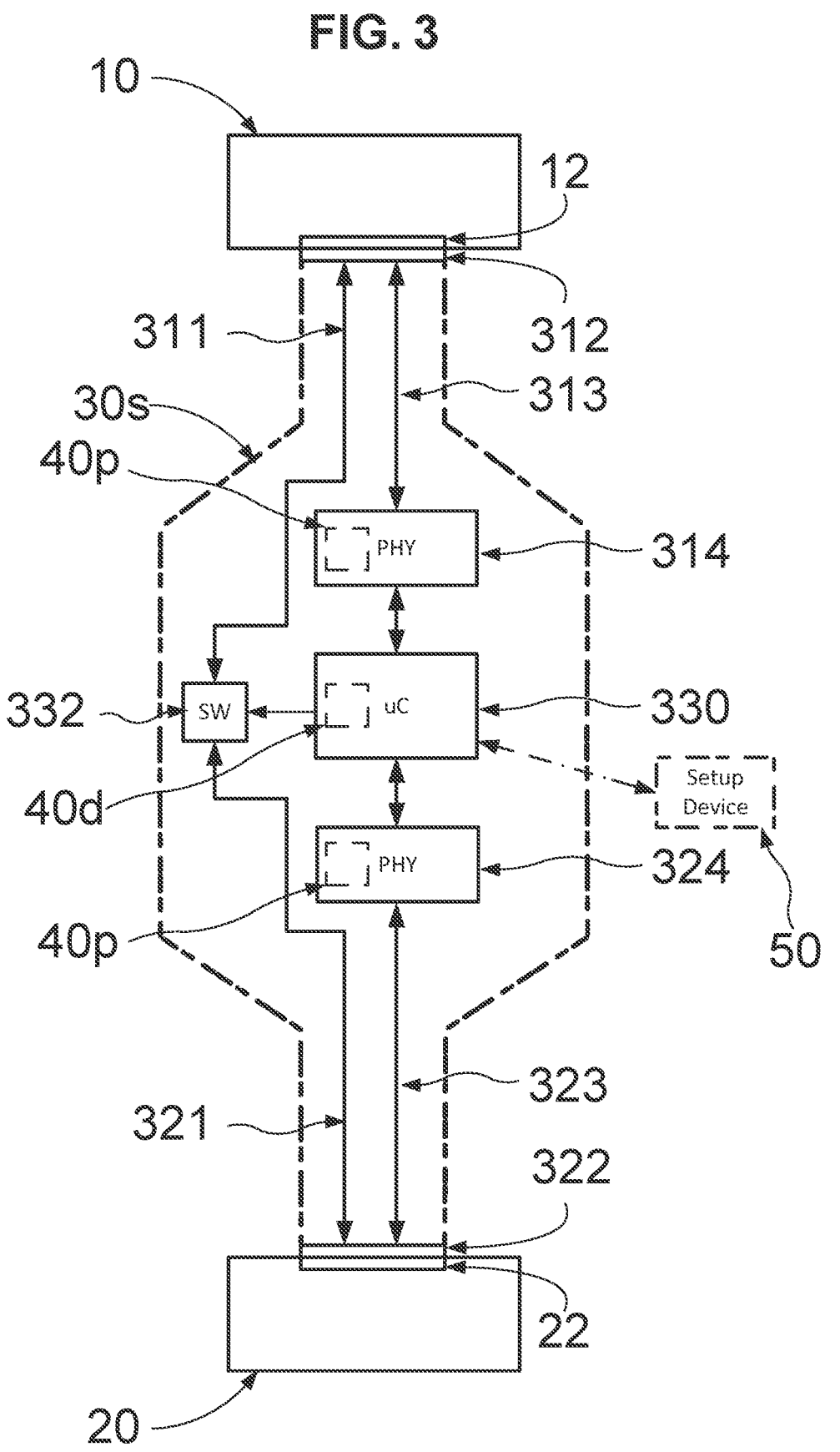

In the following detailed description, numerous specific details are set forth in order to provide a thorough understanding of the invention. However, it will be understood by those skilled in the art that the present invention may be practiced without these specific details. In other instances, well-known methods, procedures, components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing", "computing", "calculating", "determining", "establishing", "analyzing", "checking", or the like, may refer to operation(s) and/or process(es) of a state machine, a micro-controller, a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

The present invention, in some embodiments thereof, relates to security device, apparatus or circuitry/circuitries using of communication side channel, hereinafter, side channel, and more particularly, but not exclusively, to security device, apparatus, or circuitry/circuitries using a power delivery side channel, i.e., a side channel that are used, among other things, to negotiate and set the power delivery mode over the CPD interface.

In recent years, communication protocols between adjacent devices using cables are progressing dramatically. First, there was a convergence between transfer of data and transfer of power on a single protocol, cable and connectors, then power delivery side channel was introduced to negotiate different power delivery modes. The modes may differ by the identity of the device that provides the power (the power source), the supplied voltage, the maximum supplied current and the like. The first and most common protocol that uses power delivery side channel is USB, and in specific, the power delivery side channel of USB 3.X protocol that is established by adding two extra lines: CC1 and CC2, to the USB type C connector. USB power delivery protocol provides the ability for USB devices to communicate, hence negotiate between themselves, and to set dynamically the power delivery mode. While power delivery side channel has many usability advantages, it creates a new, inattentively, disadvantage of vulnerability to cyber-attacks from one device to the other using this channel. An objective of this invention is to provide security measures to reduce cyber-attacks vulnerability to devices that are connected by combined power and data communication protocol comprising power delivery side channel.

As used herein, the term "power delivery side channel" means any independent side channel integrated into a communication protocol between electronic devices that comprises one or more main communication channels, power delivery modes (carried by specified pins in the connectors defined by the communication protocol), and the power delivery side channel that is dedicated to be used to negotiate the power delivery mode used by the communication protocol. An example for power delivery side channel is the side channel of USB 3.X communication protocol using USB type C connector through CC1 and CC2 pins that is used to negotiate and determine the power delivery mode of the USB bus. Similar power delivery side channel might be incorporated in other advanced Combined Power Data (CPD) protocols such as HDMI, DP, PCU, PCI-X, Thunderbolt, Firewire, SATA, SCSI, PCI 104, GPIB, PCMCIA, CAN bus, and the like.

Figures 1, 2:
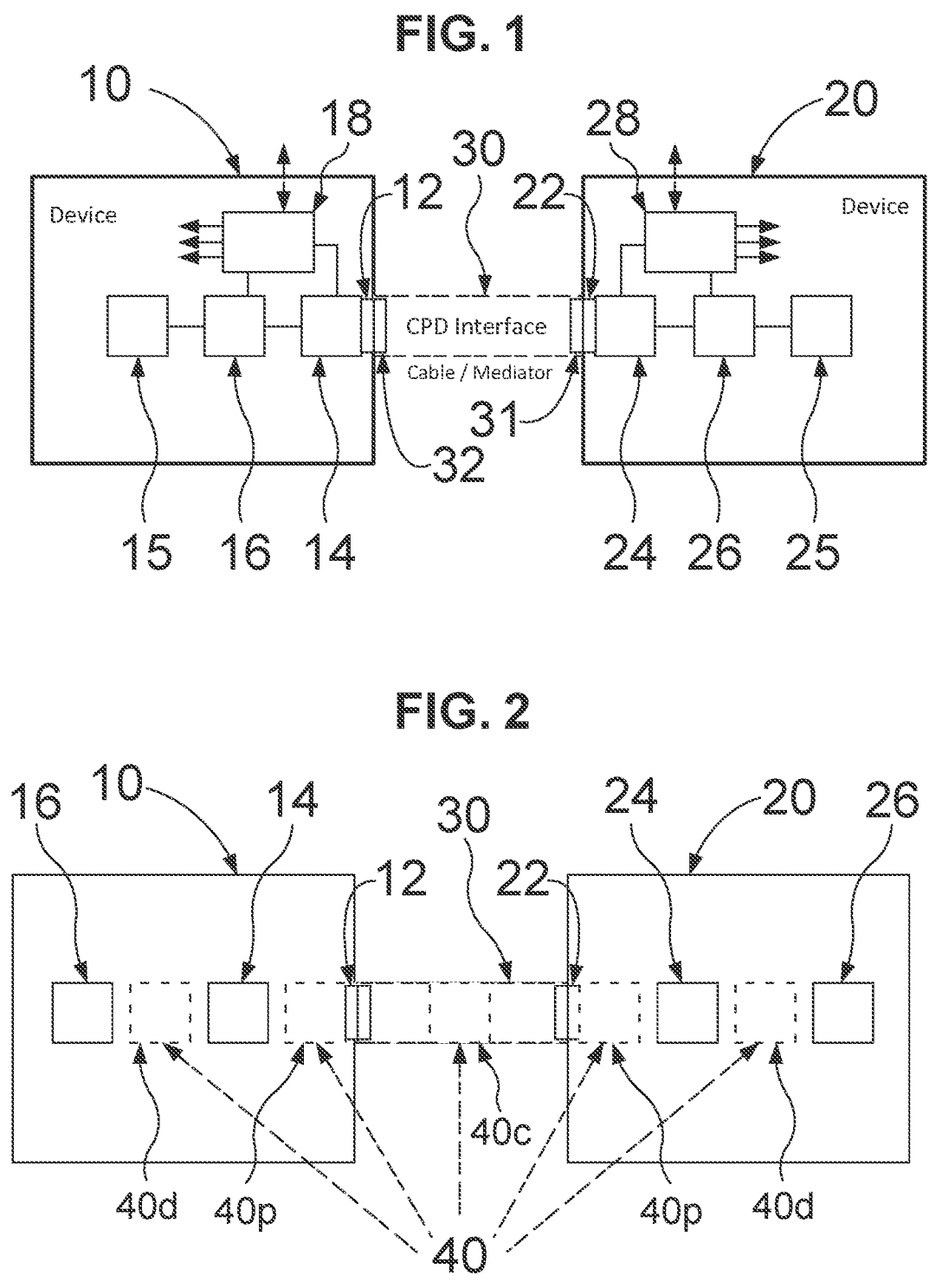

Reference is made first to FIG. 1, FIG. 1 illustrates a typical two devices that communicate using a Combined Power and Data interface, refer herein after as CPD interface. While the CPD interface may be of any of the protocols mentioned above, the USB interface will be an exemplary embodiment in this specification. With proper modifications, it is being apparent to those skilled in the art to alter the embodiments, as required, to other CPD interfaces.

CPD interface connects between a device 10 and a device 20 and transfers both data and power between the devices. Device 10 may comprise a CPD interface connector 12 to attach between device 10 and CPD interface medium 30. CPD interface connector 12 is connected to low-level, i.e., physical layer, circuitries 14 that perform the low-level data communication and power delivery functions of device 10, and high-level, i.e., data layer, protocol circuitries 16 that perform the high-level data communication and power delivery functions. The interface between physical layer circuitries 14 and high-level protocol circuitries 16 comprises data bits and may comprise other signals such as specific timing and control signals. Physical layer circuitries 14 is also connected to power circuitries 18 of device 10. Power circuitries 18 may supply power to device 10 circuitries. Optionally power circuitries 18 may get its power from external power source. Power circuitries 18 may transmit or receive power using the CPD interface medium 30. Power circuitries 18 may have internal power sources like batteries, environmental energy harvesting or the like. The actual power delivery mode, e.g., the condition where power circuitries 18 is a power source or power sink in the CPD interface medium 30, the volage and current delivered on the CPD interface medium 30 and the like, may determine by negotiation performed by physical layer circuitries 14 and high-level protocol circuitries 16. physical layer circuitries 14 and high-level protocol circuitries 16 may communicate with or control power circuitries 18 to performed the agreed upon power delivery mode.

In addition, device 10 has all other circuitries 15 that performs the functions of the device. Rest of device circuitries 15 receive the power from power circuitries 18 and communicate with other devices connected to CPD interface medium 30 through high-level protocol circuitries 16.

Device 20, and any other devices that are connected to CPD interface medium 30 in a multi-device, bus configuration deployment, has similar elements, such as, CPD interface connector 22, physical layer circuitries 24, high-level protocol circuitries 26, power circuitries 28, and Rest of device circuitries 25. These elements, 22, 24, 26,28 and 25 of device 20, function and perform similarly as described above for the matching elements in device 10.

CPD interface medium 30 may comprise CPD interface connectors 31 and 32 that connect to device 10 and 20 respectively. These connectors may be connected to each other through a cable. Alternatively, CPD interface medium 30 may comprise one or more devices, generally refers as, mediator, or mediating system. The mediating device may be hub, e.g., USB hub, a convertor to a different communication protocol, that may be other CPD protocol or data only protocol, a bridge, e.g., wireless bridge or the like. In an exemplary embodiment of the invention, device's 10 connector 12 may be connected directly to device's 20 connector 22. This configuration sometime referred to as device 20 being add-on device to device 10 or vice-versa. Note that even if there is no physical element of CPD interface medium 30, other than connectors 12 and 22 in this case, CPD interface medium still exists and connecting between the devices through the connectors of the devices. Additionally or alternatively, the CPD interface connector 12 (or 22) may be separated from the enclosure of device 10 (or 20) and connected to the physical layer circuitries 14 (or 24) directly through a cable.

While the data transferred by the side channel may be innocent, malicious code that may be running on any one of the sides, i.e., on device 10 or device 20, may exploit the power delivery side channel to perform cyber-attacks. The cyber-attacks may do many types of attacks. For example, (a) transfer malicious code from one device to the other, e.g., virus infection spreading, (b) setting some parameters in one of the devices, e.g., shutting down or powering up functions that might be undesired, and (c) leak some secret information from a classified side (a classified device) to a less classified side that might be connected, for example, to the Internet so that the information can be delivered to a remote attacker. In addition, since the protocol is used for power delivery negotiation, the power delivery channel may be used to set a power delivery mode that may harm either device (10 or 20) or both. If one device, say device 10, may stand only power delivery mode of 5 V and the other device, say device 20, may supply 100 V, a malicious code may set device 20 as the source delivering 100 V and device 10 as the power sink. In many cases, such setting may damage device 10. By using a sequence of two unallowed power delivery modes, or even with a single power delivery mode, an attacker may damage both device 10 and device 20 simultaneously. It is the objective of this invention to prevent such scenarios and others to occurred.

As used herein, the term "device" may be any device that use CPD protocol, such as, mobile devices including smartphones, PDAS, laptops, tabulates, notebook computers, and the like, peripheral devices, such as, external disks, chargers, adapters, displays, Human interface devices (keyboards, pointing devices, etc.), cameras and multimedia devices, medical devices, sensors, security devices, dongles (such as modem dongles), docking stations, peripheral sharing devices and the like.

As used herein, the terms "CPD interface" and "CPD protocol" refers to a standard that define the connectors, interfaces and protocols for delivering both data and power together in the same medium such as cable. The use of the term CPD interface is typically referred to the instances that are using the standard, while the use of the term CPD protocol is typically referred to the usage in general. These two terms may be used intermittently and should be interpreted in accordance with the accompanied context.

As used herein, the terms "CPD interface connector" or, in brief, "CPD connector" refers to the connectors that are used to connect between devices that are supporting CPD protocol either directly or through a medium.

As used herein, the terms "CPD medium" or, in brief, "medium" refers to any connecting or coupling medium between CPD supporting devices. The medium may be a cable, a connector, device's add-on connector, any mediator device such as a hub, a bridge, a router, a switch, or the like, any adapter, a peripheral switch, a peripheral sharing device, a peripheral isolator device, and a KVM switch.

As used herein, the terms "power delivery side channel" or, in brief, "power delivery channel" refers to an auxiliary data communication channel in CPD interface that is used to configure or set the power delivery mode of the CPD interface.

As used herein, the terms "power delivery mode" refers to the power scheme in CPD interface that includes setting power delivery parameters, including but not limited to at least one of: (a) the voltage of the power lines, (b) the maximum current consumption over the power lines, (c) the identities of the power source, the power sink, and the like.

Reference is made now to FIG. 2. FIG. 2 illustrates the locations of the cyber-security agents, in brief referred as security agents, to be deployed on a system comprising two devices connected by CPD protocol in order to secure the power delivery protocol of the CPD protocol.

Power delivery cyber-security agent, hereinafter, PDCSA 40, may be deployed inside CPD interface medium 30. In this case, both devices, 10 and 20, do not need any modifications. PDCSA 40c (the c stand for cable) is just an advanced cable, e.g., USB cable connecting between the two devices. The actual PDCSA 40c agent may be located in the middle of the cable, like shown in the figure, or located on one of the cable connectors attached to connectors 12 or 22, or partially implemented in any one of or any combination of these possible deployment locations.

Additionally or alternatively, PDCSA 40p (the p stands for physical layer) may be deployed between the CPD interface connector 12 or 22 and physical layer circuitries 14 or 24. Both PDCSA 40c and PDCSA 40p are exposed to all signaling of the power delivery pins hence may provide a maximum security functionality.

Additionally or alternatively, PDCSA 40d (the d stands for data layer) may be deployed between the physical layer circuitries 14 or 24 and high-level (or data layer) protocol circuitries 16 or 26. Note that in this location, PDCSA 40d is exposed to high level data transfer of the power delivery protocol, so on one hand, some of the information that was only negotiated on the physical layer is absent, but on the other hand, more meaningful information is easily accessible and may lead to more sophisticated security features. Some devices may offer both PDCSA 40p and PDCSA 40d in the same device, each cover different aspects of the taken security measures.

Reference is now made to FIG. 3. FIG. 3, illustrates, in more details, the PDCSA 40c, shown in FIG. 2. The PDCSA 40c is integrated into a cable providing CPD interface medium 30 and further provides the cyber-security measures to protect the interaction between device 10 and device 20. A cyber security cable 30s comprising CPD interface connector 312 configured to be connected to CPD interface connector 12 of device 10 and CPD interface connector 322 configured to be connected to CPD interface connector 22 of device 20. CPD interface connector 312 comprises power delivery protocol pins connected to power delivery wires 313 and all other CPD interface pins, including CPD protocol data pins, are connected to wires 311. Similarly, cyber security cable 30s comprises from the other side of the cable the CPD interface connector 322 comprises power delivery protocol pins connected to power delivery wires 323 and all other CPD interface pins connected to wires 321. In a non-secure cable 30 wires 311 and wires 321 would be directly connected and wires 313 and wires 323 would be directly connected as well.

In cyber security cable 30s there are additional circuitries to provide the cyber-security measures. Wires 313 are connected to physical layer circuitries 314. Physical layer circuitries 314 may comprise security circuitries PDCSA 40p. Wires 323 are connected to another physical layer circuitries 324. Additionally or alternatively, physical later circuitries 324 may comprise security circuitries PDCSA 40p. The data communication over the power delivery side channel between the two sides of cyber security cable 30s pass through a micro controller 330 that may act as a security agent PDCSA 40d. In normal operation, controller 330 may just transfer the data between the two devices but the data is monitored by the controller and condition upon the content of the data, controller 330 may modify the data, and/or block some of the data. In addition, controller 330 controls, by switch 332, the connection between wires 311 and wires 321 so that controller 330 may enable or disable the transfer of data between devices 10 and 20 in the main data communication channel or any auxiliary data communication channels CPD is composed of.

In an exemplary embodiment of the invention, CPD is USB protocol and, connectors 12, 22, 312 and 322 are USB connectors. In some embodiment the connectors may be USB type C connectors. Wires 313 and 323 may carry CC1 and CC2 signals of USB power delivery protocol. Switch 322 may enable or disable USB normal speed, high speed, super speed data protocols and any combination thereof.

Cyber secure cable 30s may be configured to connect to a setup device 50. Setup device 50 is configured to be connected to cyber security cable 30s by short range communication such as Bluetooth, NFC or the like. Form-factor of setup device 50 may be a credit card or a dongle carried on the user/admin hand. Additionally or alternatively, setup device 50 may be a laptop or any other equipment usually caried by an IT system administrator. Setup device 50 may configure the secure cable 30s. The configuration may include filtering parameters, white list/black list and the like, as described in more details later on. Setup device 50 may be connected using wireline connection. For example, setup device 50 may setup the cyber security cable 30s by connecting to any side of the cable through connectors 312 or 322. Alternatively, additional dedicated for setup connector may be provided by cyber security cable 30s.

Security circuitries PDCSA 40p in physical layer circuitries 314 independent or with security circuitries PDCSA 40d in controller 330 may perform the following security tasks:

Monitoring the signaling and power on the power delivery pins.

Disconnecting pins, such as power pins if malfunction is detected.

Filtering or blocking specific type of packets or messages or packets or messages with specific data payload.

Creating automatic messages, such as acknowledge messages to enable secure operation.

Detecting malicious activity on the PD protocol.

Enabling or disabling pairing of devices 10 and 20 using a preconfigured white list/black list Enabling initial pairing of devices 10 and 20 only in the presence or with a confirmation of setup device 50.

Receiving configuration and setup data and commands from setup device 50 or from any communication channels of CPD interface connector 12 or 22.

Receiving configuration and setup data and commands through short range wireless communication protocols such as Bluetooth or NFC.

Handling and managing encryption keys exchange between devices.

Enabling firmware updates of device 10 or 20 through power delivery protocol from the other device (20 or 10 respectively) only in the presence or with a confirmation of setup device 50.

Enforcing unidirectional data flow, either from device 10 to device 20 or from device 20 to device 10.

Building a profile of typical PD protocol activity and alerting abnormal behavior.

Analyzing the PD protocol traffic to detect cyber-security events.

Logging, auditing and archiving events on the power delivery channel.

Providing encrypting and decrypting over sensitive data.

Locking or disconnecting suspicious devices.

Preventing activation of some power delivery modes.

Allowing passage of only specific types of messages or data.

Performing AI processing to detect suspicious pattern of abuse of the power delivery channel.

The functionalities/circuitries split between security agents PDCSA 40p and security agent 40d may varies. In one embodiment, all security processing may be performed only by security agent 40d, while in other embodiments, the security processing may split between the security agents. Alternatively, security processing may be performed only by security agents PDCSA 40p or even may be performed only by security agent PDCSA 40p in a single side of cyber security cable 30s. Typically, high level tasks like analyzing, logging, pairing, and the like, are performed in security agent 40d while low level tasks like disconnecting pins, blocking, enforcing unidirectional data flow, and the like, are performed in security agent 40p. Security agents 40d and 40p may communicate with each other to perform a security task in collaboration with each other. For example, a blocking device operation may be triggered by security agent 40d and performed by the security agent 40p that is on the side of the blocked device.

In an exemplary embodiment of the invention, the security agent 40d and/or security agent 40p are integrated into device 10 or 20 or both. It is apparent to those skilled in the art that most of the security functions describe hereinabove for the cyber security cable 30s may be performed with obvious modification, if needed, by security agents integrated into a device.

In an exemplary embodiment of the invention, the security agents are integrated in a mediator device such as a hub, a bridge, a router, a switch, a peripheral switch, a peripheral sharing device, a peripheral isolator device, an adapter or the like. It is apparent to those skilled in the art that most of the security functions describe hereinabove for the cyber security cable 30s may be performed with obvious modification, if needed, by security agents integrated into a mediator device.

In the following sections a more detailed discussion over some exemplary cyber-attack scenario and the security measure that are taken by the security agents is provided.

In an exemplary embodiment of the invention, a device 10 (the power sink, or the sink) requesting on the power delivery channel a request to get the power source capabilities from the sink. Device 20 (the power source, or the source) send to the sink a list of available power modes, such as, 5 V/3 A, 9 V/2 A, or, 20 V/1 A. The sink request to use 5 V/3 A power mode, and the source accepts this mode, however, the source provides on the power supply pins 20 V. Security agent 40p monitor to the negotiation, detects that the source is mal-behaving and disconnect the power pins from the source (device 20) to the sink (device 10). In addition, secure cable 30s may block the device permanently, logging and alerting this activity, and block all communication channels of device 20.

In an exemplary embodiment of the invention, device 10 is hacked and running malicious code that is trying to leak sensitive data from device 10 to device 20. The malicious code is trying to transfer the data through Vendor Defined Messages (VDMs). In one embodiment, the cyber security cable 30s is configured to block the feature of communicating VDMs over the power delivery channel. Security agents 40p or 40d filters out, i.e., do not pass the messages to the other side. Optionally, Security agents 40p or 40d may send acknowledge messages to hide the fact that this feature was blocked from the sending device. In this case, the data leakage was avoided. In another exemplary embodiment of the invention, the VDMs feature is still open, however, monitoring and analyzing the traffic might detect that the data usage pattern of the VDMs is suspicious and the security agents 40p or 40d decide to block the sending device.

In an exemplary embodiment of the invention, device 10 is hacked and running malicious code that is trying to infect device 20 by changing its firmware using firmware update messages of power delivery protocol. Although, for example, the firmware update functionality of USB provides some protection like using digital signing of the software version, this feature is highly sensitive cause once broken it can easily change the firmware of all devices from the same type remotely. One way to avoid this type of attack is to completely block all firmware update functionality by the security agents 40p, 40d. Alternatively, a second level authentication, encryption/decryption is provided so that in order to perform firmware update, the attacker need to break to different/independent security mechanism. Yet, another way to allow this important feature is to have a user/admin in the loop. In this case, to enable firmware updates a third device, setup device 50 should be in proximity with the cyber security cable 30s. Optionally, the user/admin may press a button or confirm in any other way the firmware update operation.

It is to be understood that the invention is not necessarily limited in its application to the details of the exemplary cyber security cable set forth in the following description and/or illustrated in the drawings is capable of embodied in other embodiments or of being practiced or carried out in various types of devices.

It is expected that during the life of a patent maturing from this application many relevant CPD protocols will be developed and the scope of the term CPD is intended to include all such new technologies a priori.

The terms "comprises", "comprising", "includes", "including", "having" and their conjugates mean "including but not limited to".

As used herein, the singular form "a", "an" and "the" include plural references unless the context clearly dictates otherwise.

It is appreciated that certain features of the invention, which are for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A security agent that is configured to be integrated within a device or a medium that support a Combined Power Data (CPD) protocol comprising a power delivery side channel configured and operable to negotiate and set a power delivery mode over a CPD interface, the security agent is configured to secure the power delivery side channel and performs:

a) monitoring signaling and power on power delivery pins;

b) analyzing power delivery protocol traffic to detect cyber-security events; and at least one of or any combination of:

c) detecting malicious activity in the power delivery protocol traffic;

d) filtering or blocking specific type of packets or messages or packets or messages with specific data payload;

e) enforcing unidirectional data flow in power delivery protocol traffic;

f) logging, auditing and archiving events in the power delivery protocol traffic;

g) locking or disconnecting suspicious devices;

h) preventing activation of some power delivery modes;

i) disabling firmware updates through the power delivery protocol traffic;

j) enabling firmware updates through the power delivery protocol traffic only in the presence or with a confirmation of a setup device; and k) allowing passage of only specific type of packets or messages or packets or messages with specific data payloads.

2. The security agent of claim 1, wherein the security agent further performs at least one of or any combination of:

l) creating automatic messages comprising acknowledge messages to enable secure operation;

m) building a profile of typical Power Data (PD) protocol activity and alerting abnormal behavior;

n) enabling or disabling pairing of devices using a pre-configured white list/black list;

o) enabling initial pairing of devices only in the presence or with a confirmation of a setup device;

p) receiving configuration and setup data and commands from a setup device or from any communication channels of a CPD interface connector;

q) receiving configuration and setup data and commands through short range wireless communication protocols, wherein the protocols comprise at least one of Bluetooth or NFC;

r) managing and handling encryption keys exchange;

s) enabling firmware updates of device through power delivery protocol traffic from another device only in the presence or with a confirmation of a setup device;

t) providing encrypting and decrypting of sensitive data; and u) performing AI processing to detect suspicious patterns of abuse of the power delivery side channel.

3. The security agent of claim 1, wherein the device the security agent is integrated in is at least one of: mobile device, smartphones, PDA, laptop, tablet, notebook computer, external disk, charger, adapter, display, keyboard, pointing device, camera, multimedia device, medical device, sensor, security device, dongle, docking station, and KVM switch.

4. The security agent of claim 1, wherein the medium, which the security agent is integrated in, at least one of: cable, connector, add-on connector, mediator device, hub, bridge, router, switch, adapter, peripheral switch, peripheral sharing device, peripheral isolator device, and KVM switch.

5. The security agent of claim 1, wherein the security agent is implemented at least in one of the following locations or in any combination of the following locations: in between a CPD connector and CPD physical layer circuitries; as part of the CPD physical layer circuitries; in between the CPD physical layer circuitries; the CPD data layer circuitries; and as part of the CPD data layer circuitries.

6. The security agent of claim 1, wherein the security agent further comprises an element located in a data path of any one of the CPD data communication channels wherein the element performs at least one of or any combination of the following operations:

enable or disable any one of CPD data communication channels;

enforce unidirectional communication in any direction of any one of CPD data communication channels; and filters our packets or messages in any one of CPD data communication channels.

7. The security agent of claim 1, wherein the security agent is at least partially implemented using a microcontroller.

8. The security agent of claim 1, wherein the security agent is configured to communicate with a setup device.

9. The security agent of claim 1, wherein the CPD protocol is USB and the power delivery side channel is USB Power Delivery side channel.

10. The security agent of claim 1, wherein the CPD interface connector is USB type C connector.

11. The security agent of claim 10, wherein the security agent is connected to CC1 and CC2 pins of the USB type C connector.

12. A medium or a device supporting a Combined Power Data (CPD) protocol comprising a power delivery side channel configured and operable to negotiate and set a power delivery mode over a CPD interface, the medium or device comprises one and more security agents wherein the one and more security agents is configured for securing the power delivery side channel and perform:

a) monitoring signaling and power on the power delivery pins;

b) analyzing power delivery protocol traffic to detect cyber-security events; and at least one of or any combination of:

c) detecting malicious activity in the power delivery protocol traffic;

d) filtering or blocking specific type of packets or messages or packets or messages with specific data payload;

e) enforcing unidirectional data flow in power delivery protocol traffic;

f) logging, auditing and archiving events in the power delivery protocol traffic;

g) locking or disconnecting suspicious devices;

h) preventing activation of some power delivery modes;

i) disabling firmware updates through the power delivery protocol traffic;

j) enabling firmware updates through the power delivery protocol traffic only in the presence or with a confirmation of a setup device; and k) allowing passage of only specific type of packets or messages or packets or messages with specific data payloads.

13. The medium or a device of claim 12, wherein the one and more security agents further perform at least one of or any combination of:

l) creating automatic messages comprising acknowledge messages to enable secure operation;

m) building a profile of typical PD-Power Data (PD) protocol activity and alerting abnormal behavior;

n) enabling or disabling pairing of devices using a pre-configured white list/black list;

o) enabling initial pairing of devices only in the presence or with a confirmation of a setup device;

p) receiving configuration and setup data and commands from a setup device or from any communication channels of a CPD interface connector;

g) receiving configuration and setup data and commands through short range wireless communication protocols, wherein the protocols are at least one of Bluetooth or NFC;

r) managing and handling encryption keys exchange;

s) enabling firmware updates of device through power delivery protocol traffic from another device only in the presence or with a confirmation of a setup device;

t) providing encrypting and decrypting of sensitive data; and u) performing AI processing to detect suspicious patterns of abuse of the power delivery side channel.

14. The medium or the device of claim 12, wherein the device is at least one of: mobile device, smartphones, PDA, laptop, tablet, notebook computer, external disk, charger, adapter, display, keyboard, pointing device, camera, multimedia device, medical device, sensor, security device, dongle, docking station, and KVM switch.

15. The medium or the device of claim 12, wherein the medium, which the security agent is integrated in, is at least one of: cable, connector, add-on connector, mediator device, hub, bridge, router, switch, adapter, peripheral switch, peripheral sharing device, peripheral isolator device, and KVM switch.

16. The medium or the device of claim 12, wherein the security agent is implemented at least in one of the following locations or in any combination of the following locations: in between a CPD connector and CPD physical layer circuitries; as part of the CPD physical layer circuitries; in between the CPD physical layer circuitries; the CPD data layer circuitries; and as part of the CPD data layer circuitries.

17. The medium or the device of claim 12, wherein the security agent further comprises an element located in a data path of any one of a plurality of CPD data communication channels wherein the element performs at least one of or any combination of the following operations:

enable or disable any one of the plurality of CPD data communication channels;

enforce unidirectional communication in any direction of any one of the plurality of CPD data communication channels; and filters our packets or messages in any one of the plurality of CPD data communication channels.

18. The medium or the device of claim 12, wherein the security agent is at least partially implemented using a microcontroller.

19. The medium or the device of claim 12, wherein the security agent is configured to communicate with a setup device.

20. The medium or the device of claim 12, wherein the CPD protocol is USB and the power delivery side channel is USB Power Delivery side channel.

21. The medium or the device of claim 12, wherein the CPD interface connector is USB type C connector.

22. The medium or the device of claim 20, wherein the security agent is connected to CC1 and CC2 pins of the USB type C connector.

23. A method for securing devices using combined power data (CPD) protocols comprising a power delivery side channel configured and operable to negotiate and set a power delivery mode over a CPD interface, the method comprising:

providing one or more security agents in a CPD medium or between the device's CPD interface connector and the device functional circuitries, wherein the one and more security agents is configured for securing the power delivery side channel and perform:

a) monitoring the signaling and power on the power delivery pins;

b) analyzing the power delivery protocol traffic to detect cyber-security events; and at least one of or any combination of:

c) detecting malicious activity in the power delivery protocol traffic;

d) filtering or blocking specific type of packets or messages or packets or messages with specific data payload;

e) enforcing unidirectional data flow in the power delivery protocol traffic;

f) logging, auditing and archiving events in the power delivery protocol traffic;

g) locking or disconnecting suspicious devices;

h) preventing activation of some power delivery modes;

i) disabling firmware updates through the power delivery protocol traffic;

j) enabling firmware updates through the power delivery protocol traffic only in the presence or with a confirmation of a setup device; and k) allowing passage of only specific type of packets or messages or packets or messages with specific data payloads.

24. The method for securing devices of claim 23, wherein the one and more security agents further perform at least one of or any combination of:

l) creating automatic messages, such as acknowledge messages to enable secure operation;

m) building a profile of typical PD protocol activity and alerting abnormal behavior;

n) enabling or disabling pairing of devices using a pre-configured white list/black list;

o) enabling initial pairing of devices only in the presence or with a confirmation of a setup device;

p) receiving configuration and setup data and commands from a setup device or from any communication channels of a CPD interface connector;

q) receiving configuration and setup data and commands through short range wireless communication protocols, wherein the protocols comprise at least one of Bluetooth or NFC;

r) managing and handling encryption keys exchange;

s) enabling firmware updates of device through the power delivery protocol traffic from another device only in the presence or with a confirmation of a setup device;

t) providing encrypting and decrypting of sensitive data; and u) performing AI processing to detect suspicious patterns of abuse of the power delivery channel.

25. The method for securing devices of claim 23, wherein the device is at least one of: mobile device, smartphones, PDA, laptop, tablet, notebook computer, external disk, charger, adapter, display, keyboard, pointing device, camera, multimedia device, medical device, sensor, security device, dongle, docking station, and KVM switch.

26. The method for securing devices of claim 23, wherein the medium, which the security agent is integrated in, is at least one of: cable, connector, add-on connector, mediator device, hub, bridge, router, switch, adapter, peripheral switch, peripheral sharing device, peripheral isolator device, and KVM switch.

27. The method for securing devices 23, wherein the one or more security agents are implemented at least in one of the following locations or in any combination of the following locations: in between a CPD connector and CPD physical layer circuitries; as part of the CPD physical layer circuitries; in between the CPD physical layer circuitries; the CPD data layer circuitries; and as part of the CPD data layer circuitries.

28. The security agent of claim 23, wherein the security agent further comprises an element located in the data path of any one of a plurality of CPD data communication channels wherein the element performs at least one of or any combination of the following operations:

enable or disable any one of the plurality of CPD data communication channels;

enforce unidirectional communication in any direction of any one of the plurality of CPD data communication channels; and filters our packets or messages in any one of the plurality of CPD data communication channels.

29. The security agent of claim 23, wherein the security agent is at least partially implemented using a microcontroller.

30. The security agent of claim 23, wherein the security agent is configured to communicate with a setup device.

31. The security agent of claim 23, wherein the CPD protocol is USB and the power delivery side channel is USB Power Delivery side channel.

32. The security agent of claim 23, wherein the CPD interface connector is USB type C connector.

33. The security agent of claim 32, wherein the security agent is connected to CC1 and CC2 pins of the USB type C connector.

* * * * *